May 27, 1969
H. W. FRENCH ET AL
3,446,347
PICKUP HEADER
Filed March 6, 1967
Sheet 1 of 3
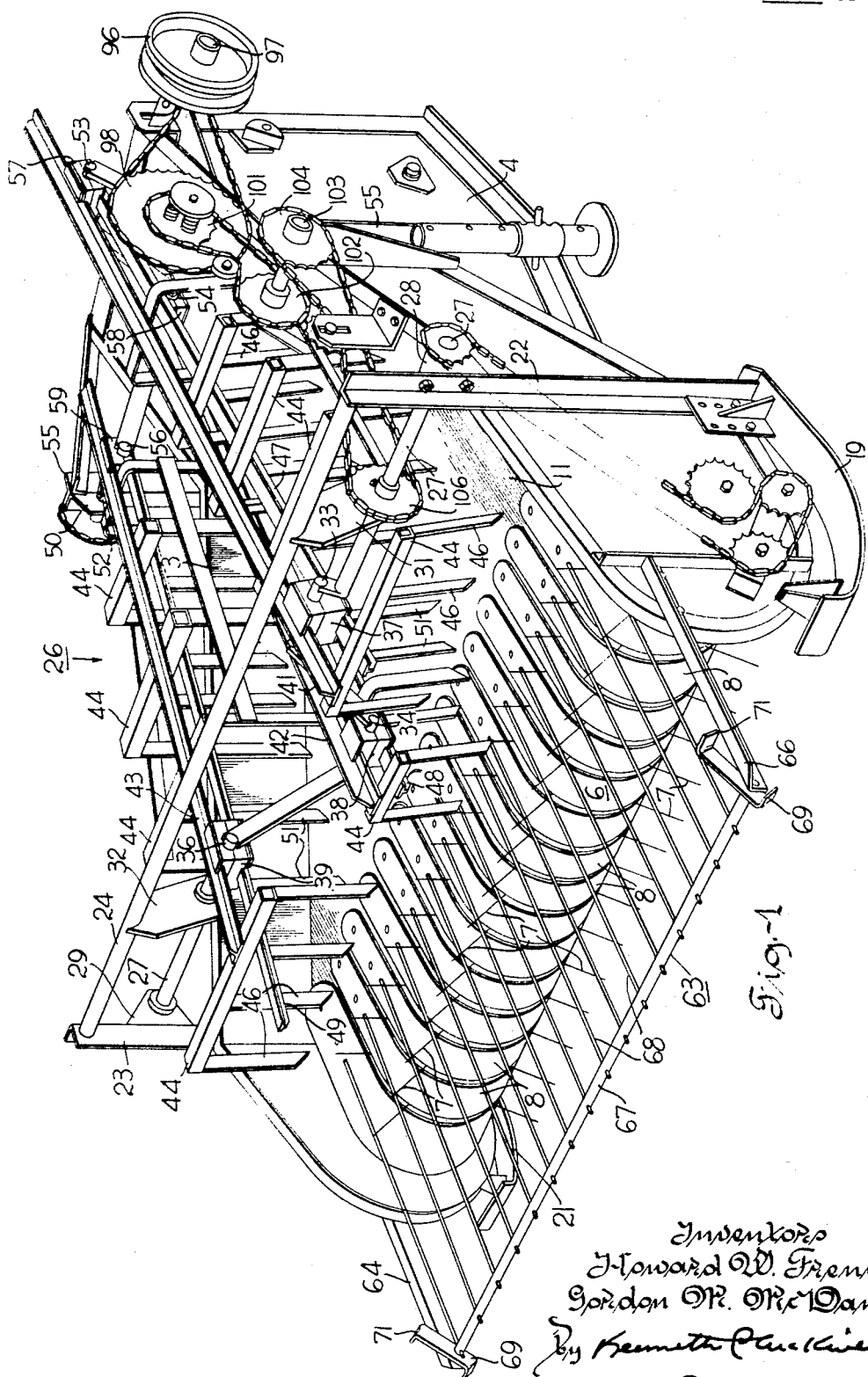
Inventors
Howard W. French,
Gordon M. McDaniel
By Kenneth (illegible)
Attorney

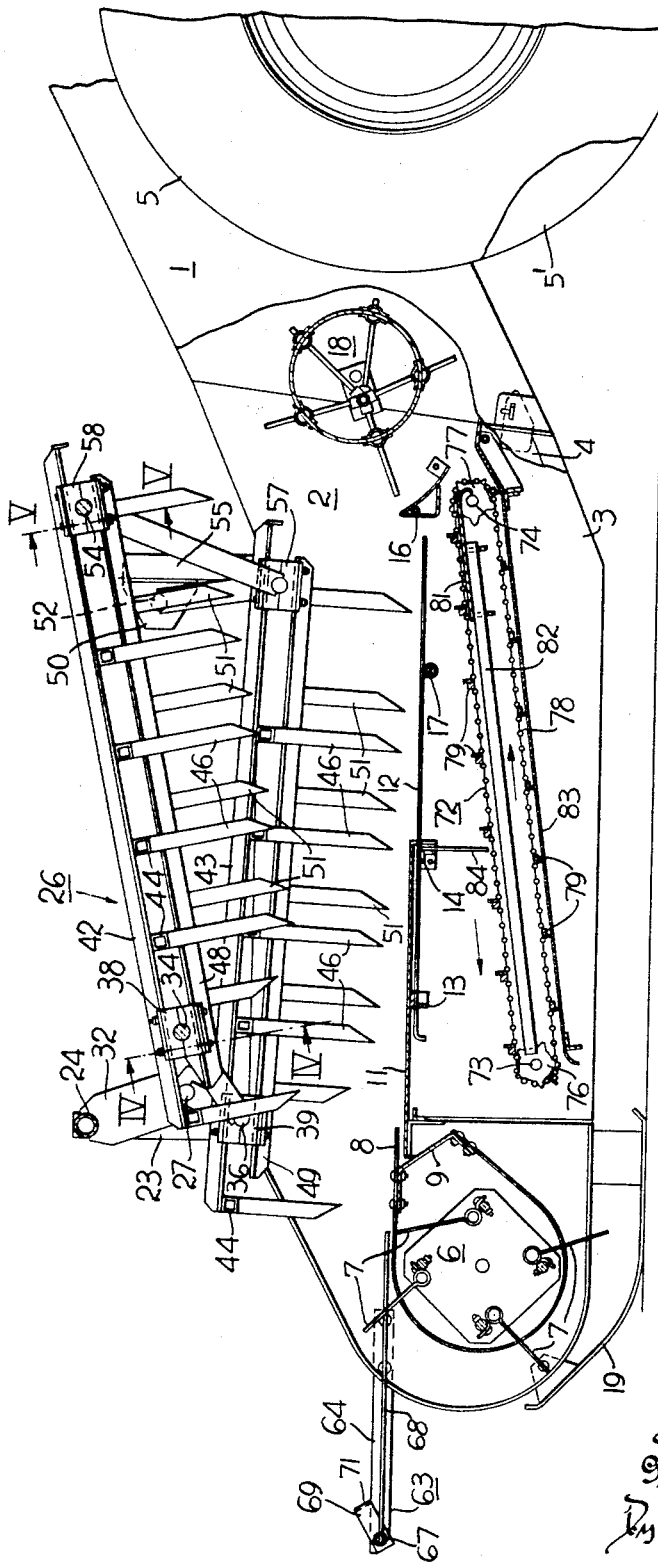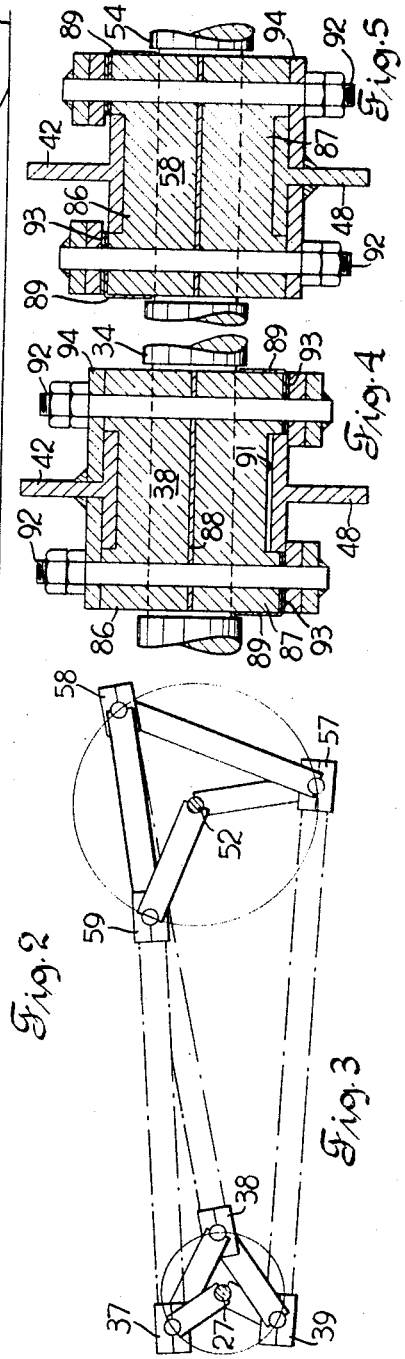

TIMING POSITION

FRONT AND REAR TINES STARTING TO SEPARATE

Inventors
Howard W. French
Gordon M. McDaniel
By Kenneth Chuckless
Attorney

3,446,347
PICKUP HEADER
Howard W. French and Gordon M. McDaniel, Independence, Mo., assignors to Allis-Chalmers Manufacturing Company, Milwaukee, Wis.
Filed Mar. 6, 1967, Ser. No. 620,685
Int. Cl. A01d 45/22, 47/00
U.S. Cl. 209—3                                                7 Claims

ABSTRACT OF THE DISCLOSURE

A harvester header has a straw walker rake mechanism including coacting pairs of movable tines for tearing a mat of bean-bearing vines. Screens disposed beneath the tines separate crop from foreign material, and a raddle conveyor moves the separated crop material to a thresher.

---

In the harvesting of edible beans such as navy beans, it has been found that such harvesting machines must provide means for separating stones, rock and dirt or the like from the vines bearing the beans and these stones and rocks should be removed before the vines reach the threshing cylinder because if the stones are of any real size, destructive contact will take place when they reach the threshing cylinder. At the same time these rocks are being separated from the vines it is desirable that such separation does not result in a loss of a large portion of the bean crop. In the prior art, straw walker types of rakes have been used to move bean vines up the header. Unfortunately this prior type of rake permitted stones and rocks to be carried by the intermeshed vines resulting in concave and threshing cylinder breakage.

It is a further object of this invention to provide a header which can be substituted for the header shown and described in U.S. Patent 2,867,958 issued to L. E. Allen for Header Mounting for Harvester Threshers when it is desired to harvest edible beans with the particular combine harvester.

It is a further object of this invention to provide means in a header for tearing the mat of bean bearing vines apart so that foreign material may drop from the material and be conveyed to the ground.

More specifically it is a further object of this invention to provide a straw walker type of rake overlying the floor of a header and wherein the rakes are provided in coacting pairs of tine bearing bars and during the material moving portion of the stroke of said bars a relative telescopic movement is achieved in the pair which results in the tines tearing apart the mat of material being moved thereby.

The construction and operation of apparatus embodying the invention will become readily apparent as the disclosure progresses and particularly points out the elements and features combined and correlated in accordance with the previously stated and other objects hereinafter set forth. Accordingly, the invention may be considered as consisting of the various details of construction, combination of elements, and arrangements of parts as is more fully set forth in the appended claims and in the detailed description, reference being had to the accompanying drawings in which:

FIG. 1 is a perspective view of the header embodying the invention;

FIG. 2 is a side elevation, partly in section, of the header shown in FIG. 1 and shown attached to a harvester thresher;

FIG. 3 is a diagrammatic side elevation of the tine bars of the header;

FIG. 4 is a view taken on line IV—IV of FIG. 2;

FIG. 5 is a view taken on line V—V of FIG. 2;

Figure 6:
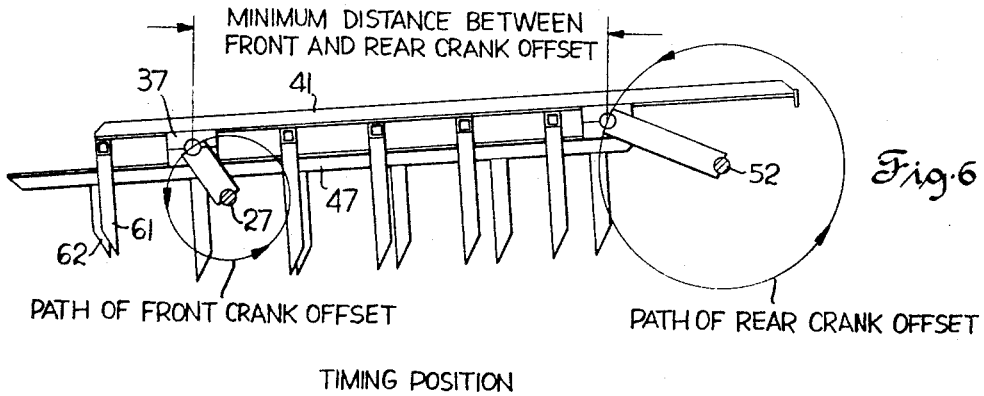
FIGS. 6, 7 and 8 are diagrammatic side elevations of the raking mechanism shown in progressive phases of operation.

The combine partially shown in FIG. 2 comprises two principal units, namely a mobile longitudinal body structure generally indicated by the reference character 1, and a header structure generally indicated by the reference character 2. The body structure 1 is of generally conventional construction in that it comprises a pair of laterally spaced front driving wheels 5 and 5' and all the other conventional combine harvester elements shown in U.S. 2,867,958 reference to which may be had if a more detailed description is desired.

The header structure 2 comprises a pair of transversely spaced side walls 3 and 4 which converge rearwardly so that the spacing of the side walls at the rear end of the header is the same spacing as the front end of the body structure thereby facilitating the attachment of the header to the body structure. At the forward ends of the side walls, a pickup device 6 is rotatably mounted therebetween. This pickup device is conventional and includes pickup fingers 7 passing between laterally spaced stripper members 8. The ends of stripper members 8 are attached to bracket 9 which in turn is attached to side walls 3 and 4. The upper rear end of strippers 8 overlies floor member 11 which is supported between side walls 3 and 4. A series of transversely spaced rods 12 supported from brackets 13 and 14 carried on a lower portion of floor 11 extend rearwardly therefrom to a point adjacent to a bracket 16 extending across the width of the header. Rods 12 are additionally supported by laterally extending support 17 carried by side walls 3 and 4. Rearwardly of bracket 16 a disappearing finger feeder member 18 is rotatably mounted in body structure 1. Material contacted by feeder member 18 is fed rearwardly to a threshing cylinder (not shown).

The forward ends of side walls 3 and 4 are supported on skid plates 19 and 21 respectively.

Vertically extending frame members 22 and 23 (FIG. 1) are attached at their lower ends to skid members 19 and 21, respectively. The upper ends of frame members 22 and 23 are joined by laterally extending frame member 24. A feeder mechanism 26 is mounted over floor 11 and between side walls 3 and 4. This feeder mechanism comprises a forward crank shaft 27 journaled in brackets 28 and 29 carried by frame members 22 and 23 respectively and shaft 27 is also journaled in brackets 31 and 32 depending from frame member 24. Crank shaft 27 is provided with three crank portions 33, 34 and 36 which are surrounded by bearing members 37, 38 and 39, respectively. Attached to the upper portion of bearing members 37, 38 and 39 for movement therewith are inverted T members or tine bars 41, 42 and 43 respectively. Each of these T members or tine bars is provided with a series of laterally extending frame members 44 having depending raking tines 46 attached thereto.

The lower portion of bearings 37, 38 and 39 slidably receive longitudinally extending T members 47, 48 and 49, respectively. Members 47, 48 and 49 are provided with a series of depending tines 51.

Feeder mechanism 26 is also provided with a rear crank shaft 52 which is journaled in brackets 50 carried by vertical members 55 which are attached to side walls 3 and 4. Crank shaft 52 is provided with three crank portions 53, 54 and 56 which are surrounded by bearing members 57, 58 and 59, respectively. The upper portion of bearing members 57, 58 and 59 slidably receive the rear portion of inverted T members 41, 42 and 43, respectively. The lower portion of bearing members 57, 58 and 59 have attached to them the rearward ends of T members 47, 48, and 49, respectively. It is to be noted as shown in FIG. 2 that the crank throw of crank shaft 53 is much greater than the throw of forward crank shaft 27. It also should be noted that the first tines on the T bars and inverted T bars starting at the front of the machine have their points cut on a bias opposite to the bias on the remaining tines. This permits ready insertion of the forward tines into a mat of material.

Figure 7:
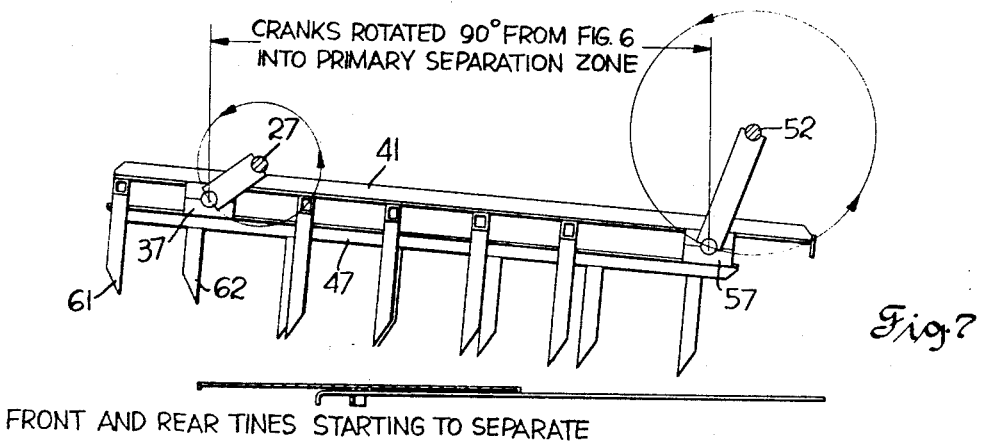
Figure 8:
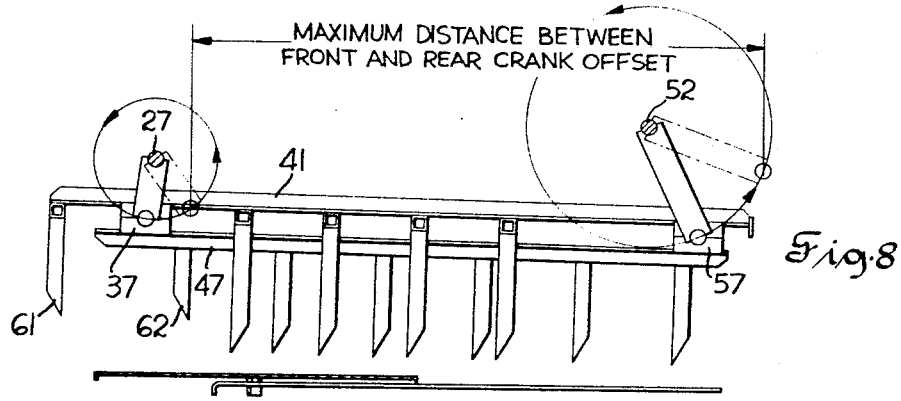

The front and rear crank shaft 27 and 52 are driven at the same number of revolutions per minute and because the throw of crank 52 is greater than shaft 27, a relative movement of the tine bars moving with these crank shafts takes place. Referring to FIGS. 6, 7 and 8, it is seen just how this relative movement takes place. In all three of these figures but one set of bearings and their connecting T bar and inverted T bar are shown, as the functioning of the other pairs of bars would be just the same.

Referring to FIG. 6, this shows the tine bearing bars in raised position and this is the position in which the front and rear cranks are adjusted to provide the proper timing. Notice the relative positions of tines 61 and 62 which are the forward or left-hand end tines on bars 41 and 47, respectively, as shown in FIG. 6. Now refer to FIG. 7 wherein the cranks have been rotated in the direction shown 90° from the position shown in FIG. 6 and tine 62 has started to move away from tine 61. In FIG. 8 the cranks have been rotated another 45° and the increase in tine separation between tine 61 and 62 is very apparent. In operation, the separation of the tines will result in a tearing of the vine material being transported by the tines and thereby permitting rocks, stones and dirt which have been meshed in the vines to drop therefrom.

Referring now to FIG. 1, it is seen that a vine holddown device 63 which comprises a pair of support members 64 and 66 attached to side walls 3 and 4, respectively. Support members 64 and 66 pivotally support a transversely extending tube 67 having a series of longitudinally extending rods 68 extending therethrough with the rearward ends thereof resting on stripper guards 8. A pair of elements 69 are attached at the ends of tube 67 for pivotal movement therewith. Each element 69 is provided with turned over portions 71 which contact supports 64 and 66 for limiting the pivotal movement of tube 67 and the rods 68 attached thereto. Holddown device 63 functions to maintain vines raised from the ground by tines 7 in contact with such tines so that the crop material can be moved rearwardly to floor 11 where it is contacted by feeder mechanism 26 for movement rearwardly to the harvesting mechanism.

As the crop material is moved rearwardly by feeder mechanism 26, such material moves over floor 11 and over rods 12. Rods 12 are laterally spaced apart so that stones, rocks and small portions of crop material can drop through between the tines 12. Positioned beneath floor 11 and rods 12 is a raddle conveyer 72 having its shafts 73 and 74 journaled in bearings carried by side walls 3 and 4, respectively. A pair of transversely spaced sprockets 76 (only one of which is shown) are attached to shaft 73 for movement therewith and a pair of sprockets 77 (only one of which is shown) are attached to shaft 74 for movement therewith. Chains 78 encircle sprockets 76 and 77 and laterally extending raddles 79 connect chains 78. The raddles move in the direction shown by the arrows in FIG. 2. Underlying the upper flight of raddles 79, a partial floor 81 is provided which is supported between side walls 3 and 4. A series of longitudinally extending transversely spaced rods 82 are attached at their rearward ends beneath floor 81. The lower flight of raddles 79 pass over a perforated floor 83, which is supported from side walls 3 and 4, and terminates at its rearward end adjacent feeder member 18 in material delivery relation thereto.

As the vine material moves over rods 12, the tines 46 and 51 tend to tear the vines apart as they move the vines rearwardly. Stones, rocks and parts of the material drop through between the rods 12 which can be flexed apart as they are only attached at one end or over the ends of such rods. This material and stones and rocks is then contacted by raddles 79 which tend to move same downwardly over rods 82 which are also flexibly mounted at but one end. Some of the stones, rocks and large clods of material will be moved off of the front end of conveyer 72 onto the ground. While some of the smaller stones, rocks and crop material will pass between rods 82, and pass between the lower flight of raddles 79 onto perforated floor 82; such material which does not pass through the perforations in floor 83 and back to the ground will be raised by raddles 79 and delivered to feeder 18 for harvesting.

A baffle 84 of flexible material is suspended from bracket 14 so as to contact the upper surface of conveyer 72 to maintain material in contact with the raddles 79.

FIG. 3 shows the phasing of the three different tine bar assemblies. When bearing 38 is at the position indicated, the adjacent bearings will be at positions shown for bearings 37 and 39 and bearing 38 connects with bearing 58 while bearings 37 and 39 connect with bearings 59 and 57, respectively.

Referring to FIGS. 4 and 5, the construction of the front and rear bearings is shown. Referring to FIG. 4, the crank portions of shaft 27 are received between upper and lower bearing members 86 and 87 respectively which are separated by shims 88. A sheet metal reinforcing band 89 is positioned about a portion of lower bearing 87 which is provided with an inset portion 91 to slidably receive T bar 48. The two bearing halves 86 and 87 are joined by bolts 92. Shims 93 are provided between bolt 92 and reinforcing band 89. Reversed T bar 42 is attached to plate 94 as by welding. The construction of bearing 57 in FIG. 5 is similar but with a reversal of parts with the exception of bearing halves 86 and 87 which are interchangeable.

Power for operating header structure 2 is obtained from the power source (not shown) on the body structure. This power source drives sheave 96 which is attached to jack shaft 97 rotatably carried by side member 4. A sprocket (not shown) on jack shaft 97 is chain connected to sprocket 98 on shaft 52 for driving same. Another sprocket 101 on shaft 52 is chain connected with a sprocket 102 on jack shaft 103 having a sprocket 104 thereon chain connected with sprocket 106 on shaft 27 for driving same. The pickup device 6 is driven from shaft 27 by conventional means.

From the foregoing it is believed that the present invention for separating dirt, rocks and other foreign objects from windrowed tangled crops, especially edible beans, has been described. The differential speeds of the front and rear crank throws results in a telescoping action of the rake bars and in turn the rear tine bars accelerate part of the windrow while the front tine bars retard part of the windrow. This acceleration and retardation tend to tear the windrow apart and to allow rocks and dirt to drop out of the windrow while the seed crop is conveyed into the harvesting mechanism of a combine harvester.

While the preferred mechanism for performing this invention has been shown and described, it will be apparent that various changes and modifications may be made therein, particularly in the form and relation of parts, without departing from the spirit of this invention as set forth in the appended claims.

The embodiments of the invention in which an exclusive property or privilege is claimed are defined as follows:

1. In combination in a harvester header adapted to transport crop material from the ground to a threshing position, the improvement comprising a straw walker line mechanism mounted above the floor of said header for moving crop material rearwardly over said floor to said threshing position, said mechanism including a forward crank and a rearward crank, means for revolving said cranks at the same rate, a pair of tine bars connecting said forward crank with said rearward crank, bearing members rotatably received about said cranks one of said pair of tine bars being attached to said forward bearing for movement therewith and the other end of said one tine bar being longitudinally slidably received by said rearward bearing, the other of said tine bars being positioned in coacting relation to said one tine bar and having its rearward end attached to said rearward bearing and its forward end longitudinally slidably received in said forward bearing, each of said tine bars supporting a series of depending tines, said cranks being so constructed and arranged that during each revolution of said bearings a relative moving apart of said tines takes place for permitting a removal of foreign material being transported by the crop material.

2. In a harvester header as recited in claim 1 and wherein said cranks being of different lengths so that a relative moving apart of said tines occurs as said tines are moving crop material rearwardly toward said threshing position.

3. In a harvester header as recited in claim 2 and wherein said header comprises a pair of generally vertically extending side walls spaced apart by a transversely extending floor and wherein said cranks are provided with shafts journaled in bearings carried by said side walls and said tine bars in their active stroke move rearwardly over said floor in contiguous relation thereto for moving crop material thereover, and wherein said relative movement of said tines causes a tearing action on said crop material thereby permitting stones to fall through the crop material and return to the ground.

4. In a harvester header as recited in claim 3 and wherein said floor is provided with an opening therein over which said tines move, transversely spaced apart rods attached at one end to said floor adjacent the lower end of said opening and extending longitudinally rearwardly over said opening, and an upper support for said rods underlying same, said rods being flexible and movable relative to said upper support so as to be movable apart by the action of stones forcing therebetween.

5. In a harvester header as recited in claim 4 and wherein a raddle conveyor is mounted below said opening and is supported from said side walls and is so driven that the upper flight thereof moves forward and the lower flight moves rearwardly in delivery relation to said threshing position.

6. In a harvester header as recited in claim 5 and wherein a series of longitudinally extending bars are positioned between said flights to permit crop material to pass therebetween, a floor underlying the lower flight and coacting therewith for moving crop material to said threshing position and wherein said bars are flexible and are attached at their upper ends so that material being moved thereover by said raddle conveyer may pass therebetween to be moved by the lower flight of said conveyor over the underlying floor and to said harvesting position.

7. In a harvester header as recited in claim 2 and wherein said rearward crank is of greater length than said forward crank whereby the tine bar attached to said rear bearing moves rearwardly at greater speed than the adjoining tine bar attached to said forward bearing.

References Cited

UNITED STATES PATENTS 35,250    5/1862    Osborn _____ 130—22
1,598,234    8/1926    Baldwin.

FRANK W. LUTTER, *Primary Examiner.*

U.S. Cl. X.R.

56—362; 130—22; 131—128; 209—257, 355